June 3, 1924.  
W. L. ADAMS  
1,496,195  
AUTOMATIC FISHING REEL  
Filed March 16, 1922
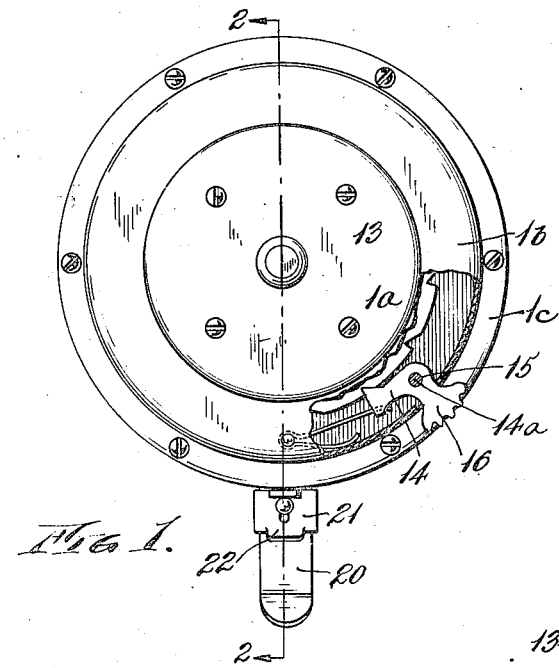
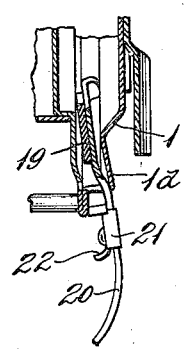
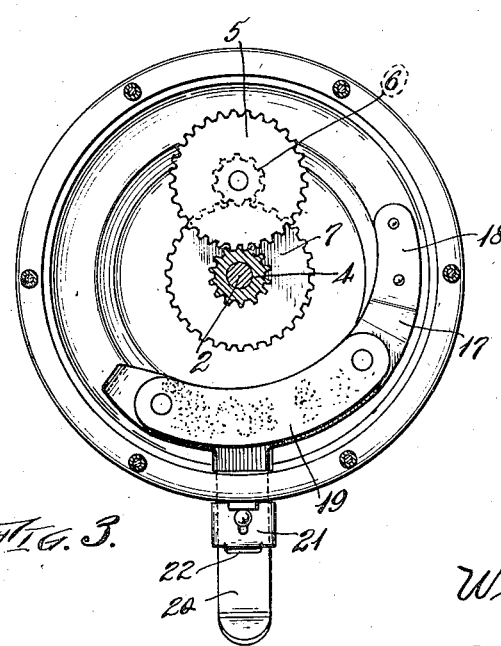
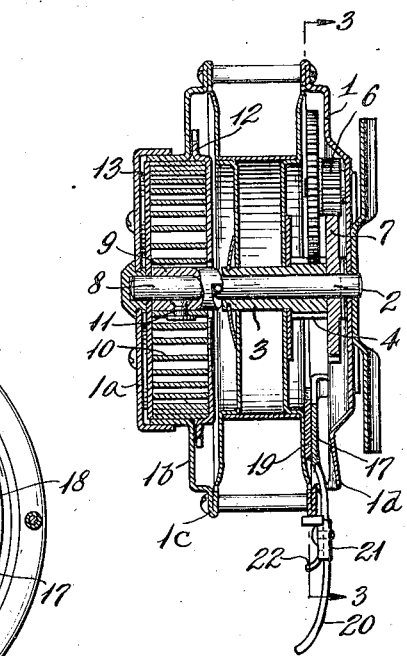
INVENTOR,  
Walter L. Adams  
By Brockett & Hyde  
Attys.

Patented June 3, 1924.

1,496,195

UNITED STATES PATENT OFFICE.

WALTER L. ADAMS, OF AKRON, OHIO, ASSIGNOR TO THE ENTERPRISE MANUFACTURING COMPANY, OF AKRON, OHIO, A CORPORATION OF OHIO.

AUTOMATIC FISHING REEL.

Application filed March 16, 1922. Serial No. 544,244.

*To all whom it may concern:*

Be it known that I, WALTER L. ADAMS, a citizen of the United States, residing at Akron, in the county of Summit and State of Ohio, have invented certain new and useful Improvements in Automatic Fishing Reels, of which the following is a specification.

This invention relates to improvements in fishing reels, especially that type of reel provided with a spring for automatically reeling in the line and a brake effective upon the spool.

The objects of this invention are to provide improved means for either releasing the brake or locking it in release position to secure the winding effect; and to provide means for permitting release of the outer or winding end of the spring to relieve any surplus tension when, for instance, the line has been fully rewound upon the spool.

In the drawings, Fig. 1 is a plan view, parts being broken out and in section; Fig. 2 is a section on the line 2—2, Fig. 1; Fig. 3 is a section on the line 3—3, Fig. 2; and Fig. 4 is a detail view corresponding to Fig. 2 and showing another position of the parts.

The reel shown comprises the frame or casing 1 through which extends a shaft 2 upon which rotates the spool 3. The frame includes the head walls 1ª having the pressed or raised portions 1ᵇ and the marginal flanges 1ᶜ. Said spool is driven by means of the pinions and gears indicated at 4, 5, 6 and 7, the last mentioned gear being fixedly mounted upon the shaft 2. A clutch connection indicated at 8 is provided between the shaft 2 and the sleeve 9 freely rotatable thereupon and to which sleeve is secured the inner end of the spring 10, as indicated at 11. The outer end of the spring is suitably attached to the ratchet disc 12 which is rotated by means of the cap 13. Disc 12 cooperates with a spring pressed pawl 14 pivotally mounted at 15 on the wall of the casing which serves to hold the spring tension at its winding end.

One feature of the present invention consists in the special arrangement of the spring pressed pawl 14 which is provided with an extension through the casing wall forming a finger piece 16 for convenient operation by the operator when it is desired to release the pawl from the ratchet to relieve any excess tension of the spring after the line has been completely rewound. This avoids storing the reel with the spring under tension and also enables the spring to be readily unwound at any time without rotation of the spool. The pawl 14 is pivoted on the transverse axis 14ª and the finger piece 16 extends through the wall of the pressed portion 1ᵇ and terminates alongside of the flange 1ᶜ.

The reel is also provided with the usual brake lever 17 which is of spring metal fixed at one end only, as at 18, to the frame wall and provided with a suitable brake shoe 19 adapted to engage a head of the spool to hold the same stationary. Brake arm 17 has a handle extension 20 through the wall of the pressed portion 1ᵇ and the bulged portion 1ᵈ for convenient manipulation by the operator to release the brake to permit winding in of the line by the spring 10. The reel is also provided with improved means for latching or holding the brake lever in ineffective position when it is desired to continuously subject the spool to the winding effect of the spring, as when playing a fish. For this purpose I have slidably mounted upon the handle 20 a latch 21, one end of which is curled upwardly, as at 22, for manipulation by the same finger which moves the brake away from the spool, while the other end of the clip is formed as a lug for engagement with the outer face of the flange 1ᶜ by releasing the brake and sliding the slip along the handle 20. Thus upon winding the spring 10 the spool may be held against rotation in the winding in direction until the handle 20 is depressed to relieve the brake. Then by sliding the latch 21 inwardly to a position between the brake lever and the outer face of the casing the brake may be maintained in release position. This avoids any necessity of the operator holding the brake in release position while playing a fish. The brake handle and the pawl are located practically opposite each other, as indicated in Fig. 1, so as to be readily accessible for operation in the manner above described.

The construction described is extremely simple and the improvements may be readily applied to any fishing reel of the automatic type.

What I claim is:

1. A fishing reel, comprising a frame, a spool rotatable therein, a winding spring connected to said spool, a brake normally engaging said spool for rendering the spring ineffective thereon, a brake actuating lever, said frame having a portion lying between said lever and the spool, and a latch slidably mounted on said lever and adapted to be moved to a position between the same and said frame portion to maintain said brake in release position.

2. A fishing reel, comprising a frame having end heads, one of which is provided with a through opening near its periphery, a spool rotatable in said frame, a winding spring connected to said spool, a brake normally engaging said spool for rendering the spring ineffective thereon, a lever extending radially through said frame head opening for actuating said brake, and a latch slidable on said lever for movement into position between the same and the outer marginal portion of the end head through which it extends to maintain said brake in release position, said latch being so constructed and arranged as to be operable by the same finger of the operator which actuates the brake.

3. A fishing reel, comprising a frame having end heads, a spool rotatable therein, spring winding mechanism operatively connected to said spool, said mechanism including a two-armed pawl and a cooperating ratchet mounted in one of said end heads, a brake for normally rendering the spring tension ineffective upon the spool, a brake release means, said pawl being pivotally mounted in said end head on an axis parallel with the spool axis and having one of its arms projecting radially outwardly through the wall of said end head and adapted to be moved circumferentially of the head by the operator's thumb to release the pawl from the ratchet to relieve the spring tension.

In testimony whereof I hereby affix my signature.

WALTER L. ADAMS.